(12) United States Patent
Rajadurai et al.

(10) Patent No.: US 11,070,969 B2
(45) Date of Patent: Jul. 20, 2021

(54) SYSTEM AND METHOD OF PERFORMING INTEGRATED MOBILE NUMBER PORTABILITY AND REMOTE SIM PROVISIONING

(71) Applicant: Samsung Electronics Co., Ltd., Suwon-si (KR)

(72) Inventors: Rajavelsamy Rajadurai, Bangalore (IN); Pratyush Pushkar, Bangalore (IN); Mallikarjuna Hampali, Bangalore (IN); Duckey Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/646,971

(22) PCT Filed: Sep. 12, 2018

(86) PCT No.: PCT/KR2018/010695
§ 371 (c)(1),
(2) Date: Mar. 12, 2020

(87) PCT Pub. No.: WO2019/054753
PCT Pub. Date: Mar. 21, 2019

(65) Prior Publication Data
US 2020/0236532 A1    Jul. 23, 2020

(30) Foreign Application Priority Data

Sep. 12, 2017  (IN) .............................. 201741032170
Sep. 7, 2018   (IN) .............................. 201741032170

(51) Int. Cl.
*H04W 8/20*     (2009.01)
*H04W 4/60*     (2018.01)
(Continued)

(52) U.S. Cl.
CPC ............. *H04W 8/205* (2013.01); *H04W 4/50* (2018.02); *H04W 4/60* (2018.02); *H04W 8/183* (2013.01);
(Continued)

(58) Field of Classification Search
CPC ...................................................... H04W 8/205
See application file for complete search history.

(56) References Cited

U.S. PATENT DOCUMENTS 8,666,405 B2    3/2014  Imbimbo et al.
2009/0313306 A1* 12/2009  Jeong ..................... H04L 41/00
(Continued)

FOREIGN PATENT DOCUMENTS

EP    0944276 A1    9/1999
EP    3054712 A1    8/2016
(Continued)

OTHER PUBLICATIONS

Supplementary European Search Report in connection with European Application No. 18856282.1 dated Jul. 8, 2020, 11 pages.
(Continued)

*Primary Examiner* — Hsinchun Liao

(57) ABSTRACT

The present invention discloses a system and method of preforming integrated mobile number portability (MNP) and remote SIM provisioning (RSP). The method includes: receiving, by a recipient BSS, a subscription request comprising an MNP request indicator from a user equipment; requesting, by the recipient BSS, the subscription request to a recipient Subscription Manager-Data Preparation (SM-DP) to initiate the RSP, creating, by the recipient SM-DP, a recipient MNO profile comprising a recipient MSISDN upon confirmation receipt of the Download Order by the recipient BSS, registering, by the recipient SM-DP, an MNP event in a Subscription Manager-discovery Server (SM-DS)
(Continued)

to initiate the MNP, retrieving, by the UE, RSP event details from the SM-DS to execute profile download, and executing, by the UE, the MNP event and the RSP by transferring an eUICC functioning from a donor MNO profile to the recipient MNO profile at porting date and time.

10 Claims, 7 Drawing Sheets

(51) Int. Cl.
    *H04W 4/50*     (2018.01)
    *H04W 8/18*     (2009.01)
    *H04W 8/28*     (2009.01)
    *H04W 60/06*     (2009.01)
    *H04W 12/30*     (2021.01)

(52) U.S. Cl.
    CPC ............. *H04W 8/28* (2013.01); *H04W 12/35* (2021.01); *H04W 60/06* (2013.01)

(56) References Cited

U.S. PATENT DOCUMENTS

| | | |
|---|---|---|
| 2010/0003966 A1 | 1/2010 | Lu et al. |
| 2015/0004967 A1 | 1/2015 | Jiang |
| 2015/0304506 A1 | 10/2015 | Zhu et al. |
| 2016/0020802 A1 | 1/2016 | Lee et al. |
| 2016/0021529 A1* | 1/2016 | Park ...................... H04W 12/08 455/410 |
| 2016/0219490 A1 | 7/2016 | Carter et al. |
| 2016/0301529 A1* | 10/2016 | Park ...................... H04L 63/126 |
| 2017/0156051 A1 | 6/2017 | Park et al. |

FOREIGN PATENT DOCUMENTS

| | | |
|---|---|---|
| WO | 2009019321 A1 | 2/2009 |
| WO | 2017166906 A1 | 10/2017 |

OTHER PUBLICATIONS

CSMG, "Reprogrammable SIMs:Technology, Evolution and Implications Final Report," Ofcom, Sep. 25, 2012, 95 pages.

GSM Association, "Remote Provisioning Architecture for Embedded UICC Technical Specification Version 2.0," Official Document SGP.02, Oct. 13, 2014, 293 pages.

International Search Report and Written Opinion regarding International Application No. PCT/KR2018/010695, dated Dec. 19, 2018, 9 pages.

* cited by examiner

SYSTEM AND METHOD OF PERFORMING INTEGRATED MOBILE NUMBER PORTABILITY AND REMOTE SIM PROVISIONING

CROSS-REFERENCE TO RELATED APPLICATIONS

This application is a 371 National Stage of International Application No. PCT/KR2018/010695 filed Sep. 12, 2018, which claims priority to Indian Patent Application No. 201741032170 filed Sep. 12, 2017 and Indian Patent Application No. 201741032170 filed Sep. 7, 2018 and, the disclosures of which are herein incorporated by reference in their entirety.

BACKGROUND

1. Field

The present invention generally relates to remote SIM provisioning in telecommunication systems and more particularly relates to a system and method for performing integrated mobile number portability and remote SIM provisioning.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The present invention discloses a system and method of preforming integrated mobile number portability (MNP) and remote SIM provisioning (RSP). The method includes: receiving, by a recipient BSS, a subscription request comprising an MNP request indicator from a user equipment; requesting, by the recipient BSS, the subscription request to a recipient Subscription Manager-Data Preparation (SM-DP) to initiate the RSP, creating, by the recipient SM-DP, a recipient MNO profile comprising a recipient MSISDN upon confirmation receipt of the Download Order by the recipient BSS, registering, by the recipient SM-DP, an MNP event in a Subscription Manager-discovery Server (SM-DS) to initiate the MNP, retrieving, by the UE, RSP event details from the SM-DS to execute profile download, and executing, by the UE, the MNP event and the RSP by transferring an eUICC functioning from a donor MNO profile to the recipient MNO profile at porting date and time.

BRIEF DESCRIPTION OF THE DRAWINGS

The other objects, features and advantages will occur to those skilled in the art from the following description of the preferred embodiment and the accompanying drawings in which.

Figure 1:
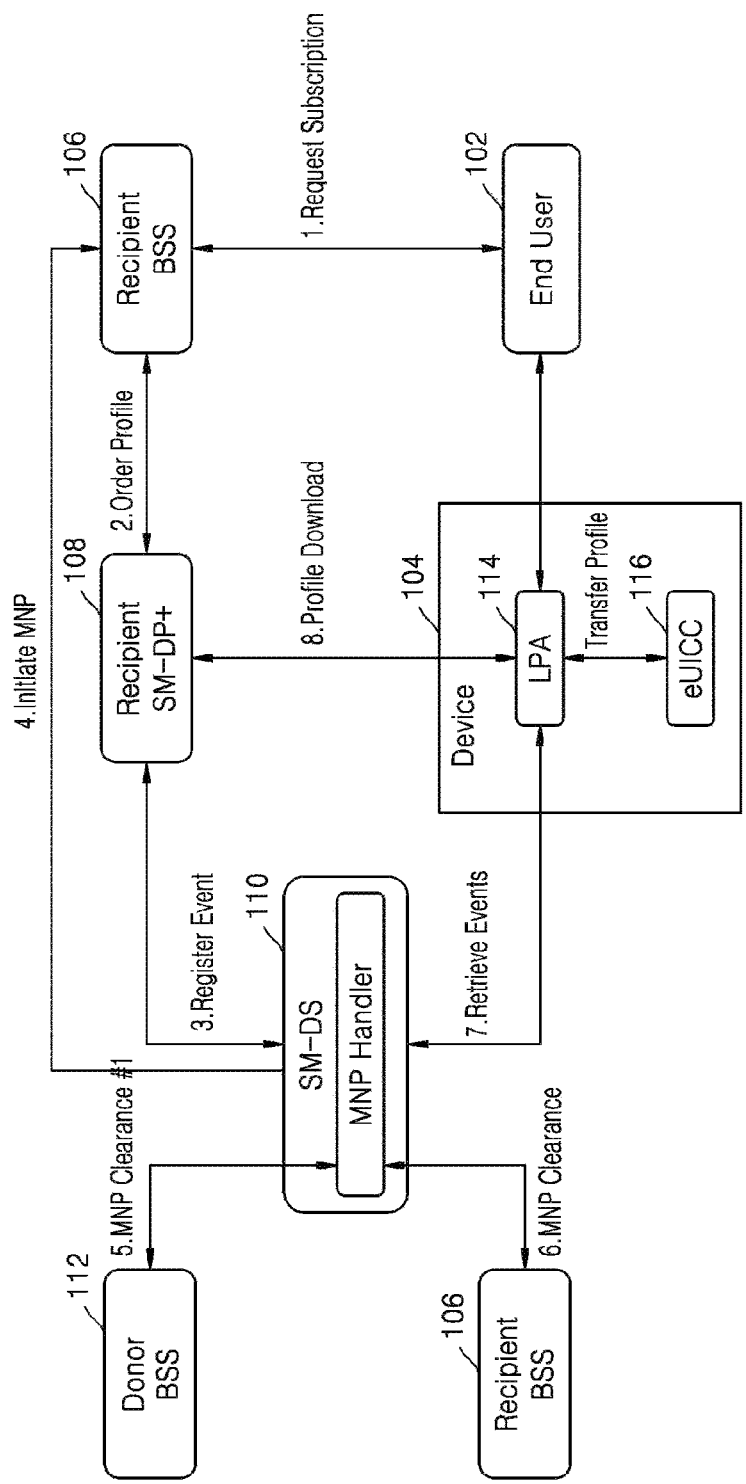
FIG. 1 is a schematic block diagram illustrating a system view of a user triggering a subscription request to a recipient Business Support System (BSS) to perform integrated mobile number portability (MNP) and remote SIM provisioning (RSP), according to an embodiment of the present invention.

Although specific features of the present invention are shown in some drawings and not in others, this is done for convenience only as each feature may be combined with any or all of the other features in accordance with the present invention.

DETAILED DESCRIPTION

Various embodiments of the present invention disclose a method of preforming integrated mobile number portability (MNP) and remote SIM provisioning. The method includes: receiving, by a recipient Business Support System (BSS), a subscription request comprising an MNP request indicator from a user equipment (UE); sending, by the recipient BSS, the subscription request to a recipient Subscription Manager-Data Preparation (SM-DP) to initiate the remote SIM provisioning, creating, by the recipient SM-DP, a recipient MNO profile comprising a recipient Mobile Station International Subscriber Directory Number (MSISDN) upon confirmation receipt of the Download Order by the recipient BSS, registering, by the recipient SM-DP, an MNP event (comprising RSP event details) in a Subscription Manager-discovery Server (SM-DS) to initiate the MNP, executing, by the SM-DS, the MNP event (e.g. MNP procedures) with at least one of, the Donor BSS, the Recipient BSS and the MCHA, based on the registration by the SM-DP, retrieving, by the UE, RSP event details from the SM-DS to execute the RSP event in response to an event retrieve request sent to the SM-DS, and executing, by the UE, the remote SIM provisioning by transferring an embedded Universal Integrated Circuit Card (eUICC) functioning from a donor MNO profile to the recipient MNO profile at porting date and time.

According to an embodiment, executing the MNP event initiated by the SM-DS includes: providing, by the donor BSS, a unique porting code (UPC) to the SM-DS in response to a UPC request sent by the SM-DS to the donor BSS, initiating, by the SM-DS, an MNP request to the recipient BSS upon receipt of the UPC, communicating, by the recipient BSS, the MNP request to a MNP Clearing house administrator (MCHA) in response to an MNP initiation request sent by the SM-DS to the recipient BSS, receiving, by the MCHA, an MNP clearance from the donor BSS in response to an MNP clearance request sent by the MCHA to the donor BSS, setting, by the MCHA, the porting date and time for scheduling the MNP upon receipt of the MNP clearance, communicating, by the MCHA, the porting date and time to the donor BSS for deactivation of subscription of the UE, and the recipient BSS for activation of the subscription of the UE, communicating, by the recipient BSS, the porting date and time to the UE, and the SM-DS to trigger an event ready message to the SM-DP, sending, by the recipient SM-DP, a profile ready message to the recipient BSS upon receipt of the event ready message from the SM-DS, and transferring, by the LPA, an embedded Universal Integrated Circuit Card (eUICC) functioning from the donor MNO profile to the recipient MNO profile at the porting date and time.

According to another embodiment, executing the MNP event when decentralized and initiated by the SM-DS includes: providing, by the donor BSS, a unique porting code (UPC) to the SM-DS in response to a UPC request sent by the SM-DS to the donor BSS, initiating, by the SM-DS, an MNP request to the recipient BSS upon receipt of the UPC, communicating, by the recipient BSS, an MNP request to the donor BSS, performing, between the recipient BSS and the donor BSS, an MNP clearance and settlement between the recipient BSS and the donor BSS, communicating, between the recipient BSS and the donor BSS, to set the porting date and time for scheduling the MNP; communicating, by the recipient BSS, the porting date and time to the UE, and the SM-DS to trigger an event ready message to the SM-DP, sending, by the recipient SM-DP, a profile ready message to the recipient BSS upon receipt of the event ready message from the SM-DS, and transferring, by the LPA, an embedded Universal Integrated Circuit Card (eUICC) functioning from the donor MNO profile to the recipient MNO profile at the porting date and time.

According to yet another embodiment, transferring the embedded Universal Integrated Circuit Card (eUICC) functioning from the donor MNO profile to the recipient MNO profile at the porting date and time, includes: deactivating, by the donor BSS, a subscription of the UE to a donor MNO, activating, by the recipient BSS, the subscription of the UE to a recipient MNO, discarding, by the UE, the donor MNO profile stored within the UE and communicating an event retrieve request to the SM-DS, downloading, by the UE, the recipient MNO profile from the recipient SM-DP onto a local profile assistant (LPA) unit, communicating, by the SM-DS, a profile mapping request to the recipient BSS to map the recipient MNO profile onto the donor MNO profile, and communicating, by the recipient BSS, an MNP completion indication to a recipient home subscriber server (HSS) to enable the eUICC to establish communication via the recipient HSS utilizing the recipient MNO profile.

In one aspect, a method of preforming integrated mobile number portability (MNP) and remote SIM provisioning is described herein. The method includes: sending, by the donor BSS, a unique porting code (UPC) to a local profile assistant (LPA) unit in response to a UPC request sent by the LPA unit to the donor BSS, receiving, by a recipient Business Support System (BSS), a subscription request comprising the UPC and an MNP request indicator from a user equipment (UE), sending, by the recipient BSS, the subscription request to a recipient Subscription Manager-Data Preparation (SM-DP) to initiate the remote SIM provisioning, creating, by the recipient SM-DP, a recipient MNO profile comprising a recipient Mobile Station International Subscriber Directory Number (MSISDN) upon confirmation receipt of the Download Order by the recipient BSS, registering, by the recipient SM-DP, an MNP event in a Subscription Manager-discovery Server (SM-DS) to initiate the MNP, executing, by the SM-DS, the MNP event (e.g. MNP procedures) with at least one of, the Donor BSS, the Recipient BSS and the MCHA, based on the registration by the SM-DP, retrieving, by the UE, RSP event details from the SM-DS to execute the RSP in response to an event retrieve request sent to the SM-DS, and executing, by the UE, the remote SIM provisioning by transferring an embedded Universal Integrated Circuit Card (eUICC) functioning from a donor MNO profile to the recipient MNO profile at porting date and time.

According to an embodiment, executing the MNP event when initiated by the LPA unit includes: communicating, by the recipient BSS, an MNP request to a MNP Clearing house administrator (MCHA) in response to an MNP initiation request sent by the SM-DS to the recipient BSS, receiving, by the MCHA, an MNP clearance from the donor BSS in response to an MNP clearance request sent by the MCHA to the donor BSS, setting, by the MCHA, the porting date and time for scheduling the MNP upon receipt of the MNP clearance, communicating, by the MCHA, the porting date and time to the donor BSS for deactivation of subscription of the UE, and the recipient BSS for activation of the subscription of the UE, communicating, by the recipient BSS, the porting date and time to the UE, and the SM-DS to trigger an event ready message to the SM-DP, sending, by the recipient SM-DP, a profile ready message to the recipient BSS upon receipt of the event ready message from the SM-DS, and transferring, by the LPA, an embedded Universal Integrated Circuit Card (eUICC) functioning from the donor MNO profile to the recipient MNO profile at the porting date and time.

According to another embodiment, executing the MNP event when decentralized and initiated by the LPA unit includes: communicating, by the recipient BSS, an MNP request to the donor BSS, performing, by the recipient BSS and the donor BSS, an MNP clearance and settlement between the recipient BSS and the donor BSS, communicating, between the recipient BSS and the donor BSS, to set the porting date and time for scheduling the MNP, communicating, by the recipient BSS, the porting date and time to the UE, and the SM-DS to trigger an event ready message to the SM-DP, sending, by the recipient SM-DP, a profile ready message to the recipient BSS upon receipt of the event ready message from the SM-DS, and transferring, by the LPA, an embedded Universal Integrated Circuit Card (eUICC) functioning from the donor MNO profile to the recipient MNO profile at the porting date and time.

According to yet another embodiment, transferring the embedded Universal Integrated Circuit Card (eUICC) functioning from the donor MNO profile to the recipient MNO profile at the porting date and time, includes: deactivating, by the donor BSS, a subscription of the UE to a donor MNO, activating, by the recipient BSS, the subscription of the UE to a recipient MNO, discarding, by the UE, the donor MNO profile stored within the UE and communicating an event retrieve request to the SM-DS, downloading, by the UE, the recipient MNO profile from the recipient SM-DP onto a local profile assistant (LPA) unit, communicating, by the SM-DS, a profile mapping request to the recipient BSS to map the recipient MNO profile onto the donor MNO profile, and communicating, by the recipient BSS, an MNP completion indication to a recipient home subscriber server (HSS) to enable the eUICC to establish communication via the recipient HSS utilizing the recipient MNO profile.

In yet another aspect, a method for supporting mobile number portability (MNP) for a user along with Remote SIM provisioning (RSP) is described herein. The method includes triggering, by the user, a subscription request to a recipient BSS, wherein the subscription request includes Mobile Station International Subscriber Directory Number (MSISDN), Mobile country Code (MCC), Mobile Network Code (MNC) and an MNP flag, forwarding, by the recipient BSS, the subscription request to a recipient SM-DP (Subscription Manager-Data Preparation) based on which the recipient SM-DP prepares a recipient MNO profile using the MSISDN, initiating, by the recipient SM-DP, an MNP procedure with an SM-DS by associating users EID (Embedded UICC Identifier) with the MNP, MSISDN and MCC and MNP of a donor MNO, and requesting, by the recipient SM-DS (Subscription Manager-Discovery Server), a UPC (Unique Porting code) from a donor BSS and forwarding the requested UPC along with the MSISDN to the recipient BSS to execute the MNP procedure.

According to an embodiment, executing the MNP procedure initiated by the SM-DS includes: initiating, by the SM-DS, an MNP request to the recipient BSS upon receipt of the UPC from the donor BSS, communicating, by the recipient BSS, the MNP request to an MNP Clearing house administrator (MCHA) in response to an MNP initiation request sent by the SM-DS to the recipient BSS, receiving, by the MCHA, an MNP clearance from the donor BSS in response to an MNP clearance request sent by the MCHA to the donor BSS, setting, by the MCHA, porting date and time for scheduling the MNP upon receipt of the MNP clearance, communicating, by the MCHA, the porting date and time to the donor BSS for deactivation of subscription of the UE to the donor MNO, and the recipient BSS for activation of the subscription of the UE to a recipient MNO, communicating, by the recipient BSS, the porting date and time to the UE, and the SM-DS to trigger an event ready message to the SM-DP, sending, by the recipient SM-DP, a profile ready message to the recipient BSS upon receipt of the event ready message from the SM-DS; and transferring, by the Local Profile Assistant (LPA) unit, an embedded Universal Integrated Circuit Card (eUICC) functioning from a donor MNO profile to a recipient MNO profile at the porting date and time.

According to another embodiment, executing the MNP procedure when decentralized and initiated by the SM-DS includes: initiating, by the SM-DS, an MNP request to the recipient BSS upon receipt of the UPC from the donor BSS, communicating, by the recipient BSS, an MNP request to the donor BSS, performing, by the recipient BSS and the donor BSS, an MNP clearance and settlement between the recipient BSS and the donor BSS, communicating, by the recipient BSS and the donor BSS, to set the porting date and time for scheduling the MNP, communicating, by the recipient BSS, the porting date and time to the UE, and the SM-DS to trigger an event ready message to the SM-DP, sending, by the recipient SM-DP, a profile ready message to the recipient BSS upon receipt of the event ready message from the SM-DS; and transferring, by the LPA, an embedded Universal Integrated Circuit Card (eUICC) functioning from a donor MNO profile to a recipient MNO profile at the porting date and time.

According to yet another embodiment, transferring the embedded Universal Integrated Circuit Card (eUICC) functioning from the donor MNO profile to the recipient MNO profile at the porting date and time, includes: deactivating, by the donor BSS, a subscription of the UE to the donor MNO, activating, by the recipient BSS, the subscription of the UE to a recipient MNO, discarding, by the UE, the donor MNO profile stored within the UE and communicating an event retrieve request to the SM-DS, downloading, by the UE, the recipient MNO profile from the recipient SM-DP onto a local profile assistant (LPA) unit, communicating, by the SM-DS, a profile mapping request to the recipient BSS to map the recipient MNO profile onto the donor MNO profile; and communicating, by the recipient BSS, an MNP completion indication to a recipient home subscriber server (HSS) to enable the eUICC to establish communication via the recipient HSS utilizing the recipient MNO profile.

In yet another aspect, a system for preforming integrated mobile number portability (MNP) and remote SIM provisioning, initiated by a Subscription Manager-discovery Server (SM-DS) is described herein. The system includes: a recipient business support system (BSS), a recipient SM-DP, a SM-DS and an MNP Clearing house administrator (MCHA). The recipient BSS being adapted to receive a subscription request from a user equipment (UE), and send the subscription request to a recipient Subscription Manager-Data Preparation (SM-DP) to initiate the remote SIM provisioning. The recipient SM-DP being adapted to create a recipient MNO profile comprising a recipient Mobile Station International Subscriber Directory Number (MSISDN) upon confirmation receipt of the Download Order by the recipient BSS and register an MNP event in the SM-DS to initiate the MNP. The SM-DS being adapted to receive a unique porting code from a donor BSS in response to an UPC request sent by the SM-DS to the donor BSS and provide an MNP initiation request to the recipient BSS upon receipt of the unique porting code from the donor BSS. The MCHA being adapted to receive an MNP clearance from the donor BSS in response to an MNP clearance request sent by the MCHA to the donor BSS and set a porting date and time to execute the MNP event and communicates the porting date and time to the donor BSS for deactivating subscription of the UE and the recipient BSS for activating subscription of the UE to a recipient MNO.

In yet another aspect, a system for preforming integrated mobile number portability (MNP) and remote SIM provisioning, initiated by a local profile assistant (LPA) unit is described herein. The system includes a donor BSS, a recipient business support system (BSS), a recipient SM-DP, a SM-DS, and an MNP Clearing house administrator (MCHA). The donor BSS being adapted to send a unique porting code to the LPA unit in response to a UPC request sent by the LPA unit to the donor BSS. The recipient BSS being adapted to receive a subscription request from a user equipment (UE); and send the subscription request to a recipient Subscription Manager-Data Preparation (SM-DP) to initiate the remote SIM provisioning. The recipient SM-DP being adapted to create a recipient MNO profile comprising a recipient Mobile Station International Subscriber Directory Number (MSISDN) upon confirmation of the Download Order by the recipient BSS; and register an MNP event in a Subscription Manager-discovery Server (SM-DS) to initiate the MNP. The SM-DS being adapted to provide an MNP initiation request to the recipient BSS upon registering the event in the SM-DS. The MCHA being adapted to receive an MNP clearance from the donor BSS in response to an MNP clearance request sent by the MCHA to the donor BSS and set a porting date and time to execute the MNP event and communicates the porting date and time to the donor BSS for deactivating subscription of the UE and the recipient BSS for activating the subscription of the UE.

In yet another aspect, a system for preforming integrated mobile number portability (MNP) and remote SIM provisioning, decentralized and initiated by a Subscription Manager-discovery Server (SM-DS) is described herein. The system includes: a recipient business support system (BSS), a recipient SM-DP, a SM-DS, and a donor BSS. The recipient BSS being adapted to receive a subscription request from a user equipment (UE), and send the subscription request to a recipient Subscription Manager-Data Preparation (SM-DP) to initiate the remote SIM provisioning. The recipient SM-DP being adapted to create a recipient MNO profile comprising a recipient Mobile Station International Subscriber Directory Number (MSISDN) upon confirmation of the Download Order by the recipient BSS and register an MNP event in the SM-DS to initiate the MNP. The SM-DS being adapted to receive a unique porting code (UPC) from a donor BSS in response to an UPC request sent by the SM-DS to the donor BSS and provide an MNP initiation request to the recipient BSS upon receipt of the unique porting code from the donor BSS. The donor BSS being adapted to receive an MNP request from the recipient BSS to perform MNP clearance and settlement between the donor BSS and the recipient BSS and communicate to the recipient BSS to set a porting date and time to execute the MNP event and the remote SIM provisioning.

In yet another aspect, a system for preforming integrated mobile number portability (MNP) and remote SIM provisioning, decentralized and initiated by a local profile assistant (LPA) unit is described herein. The system includes: a donor BSS, a recipient business support system (BSS), a recipient SM-DP, SM-DS and a donor BSS. The donor BSS being adapted to send a unique porting code (UPC) to the LPA unit in response to a UPC request sent by the LPA unit to the donor BSS. The recipient BSS being adapted to receive a subscription request from a user equipment (UE) and send the subscription request to a recipient Subscription Manager-Data Preparation (SM-DP) to initiate the remote SIM provisioning. The recipient SM-DP being adapted to create a recipient MNO profile comprising a recipient Mobile Station International Subscriber Directory Number (MSISDN) upon confirmation of the Download Order by the recipient BSS and register an MNP event in a Subscription Manager-discovery Server (SM-DS) to initiate the MNP. The SM-DS being adapted to provide an MNP initiation request to the recipient BSS upon registering the event in the SM-DS. The donor BSS being adapted to receive an MNP request from the recipient BSS to perform MNP clearance and settlement between the donor BSS and the recipient BSS and communicate to the recipient BSS to set a porting date and time to execute the MNP event and the remote SIM provisioning.

The present invention minimizes the manual intervention in executing the MNP. The present invention allows the MNP to execute automatically via the remote SIM provisioning. The present invention further minimizes MSISDN conflicts between the donor MNOs and the recipient MNOs. The present invention further provides a centralized method using MCHA and a decentralized method to execute the integrated MNP and the remote SIM provisioning.

The foregoing has outlined, in general, the various aspects of the invention and is to serve as an aid to better understand the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

The present invention describes a system and method of performing integrated mobile number portability and remote SIM provisioning. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Currently, transfer (closing and opening) of the subscription between the operators with Mobile Number Portability (MNP) is supported in many countries. MNP is done independently during switching (closing and opening) of the subscription. The operator (Mobile Network Operator (MNO)) provides access and communication services to its subscribers (user who has contract with the MNO to obtain service) through their mobile network infrastructure. Mobile Number Porting is the process of migrating mobile number (for example, MSISDN) from one MNO to another MNO. Donor Operator is the one to whose network the mobile number belongs at the time the subscriber makes a request for porting. Recipient Operator means the MNO who will be providing mobile service to the subscriber after porting.

The user initiates the process by making a request in writing to the concerned Recipient Operator in specified format. Then the recipient Operator requests the user to obtain a Unique Porting Code (UPC) from the donor operator. A user obtains the UPC and then the user submits the UPC to the recipient operator for number porting. Then the MNP is performed with the new subscription activation between the Donor, Recipient and MNP service provider (MNP Clearing House Administrator (MCHA)) in the backend. In the present scenario, the system and method are person triggered and MNP procedure is taken forward between the operators. Further, the system and method perform semi-manual verification and activation of MNP. Further, there is no mediator for the MNP procedure and user needs to submit the request manually to both Operators and backend verification is performed by the Operators with MCHA before activation. Further, the system and method perform isolated procedure where there is subscription change and MNP are isolated.

In case of remote SIM provisioning, since MSISDN is an essential part for the Subscription and it is required well in advance for preparation of the profile and before provisioning in to the eUICC, so that activation of subscription is done successfully and user is reachable with the MSISDN number. In case, if the remote SIM provisioning needs to support MNP, then there is a need for new mechanism to sequence the MNP procedure along with Remote provisioning to allow user to persist the existing the mobile number with the recipient operator and/or to minimize the no service time. In the present scenario, initiation of the porting process is an off-line administrative process and cannot be invoked via a specific Man Machine Interface (MMI) on the hand-set, where as remote SIM provisioning procedure is initiated on the hand-set. Accordingly, there remains a need for the system and method to perform integrated mobile number portability and remote SIM provisioning with less manual intervention.

The above-mentioned shortcomings, disadvantages and problems are addressed herein and which will be understood by reading and studying the following specification.

FIG. 1 is a schematic block diagram illustrating a system view of a user 102 triggering a subscription request to a recipient Business Support System (BSS) 106 to perform integrated mobile number portability (MNP) and remote SIM provisioning (RSP), according to an embodiment of the present invention. The system includes the recipient BSS 106, a donor BSS 112, a Recipient Subscription Manager-Data Preparation (SM-DP) 108, Subscription Manager-Discovery Server (SM-DS) 110, the user equipment (UE) 104 and a recipient Home Subscriber Server (HSS). The user 102 triggers the subscription request to the recipient BSS 106 through an application configured in the user equipment (UE) 104. The applicant may be a recipient mobile network operator (MNO) application. The subscription request includes a mobile number portability indicator. The mobile number portability indicator includes a user selected plan, recipient mobile network operator (MNO) details (Mobile Network Code (MNC) and a Mobile Country Code (MCC)) and a Mobile Station International Subscriber Directory Number (MSISDN). The application retrieves the MCC, MNC and the MSISDN from the user equipment 104 to send the MNP indicator. The user equipment 104 may be one of a mobile phone, a tablet, a communication device (e.g. smart watches, etc.) and a personal digital assistance. The UE 104 includes an embedded Universal Integrated Circuit Card (eUICC) 116 and a local profile assistant (LPA) unit 114. The eUICC 116 includes storage space adapted to hold one or more profiles of different mobile network operators (MNO).

The recipient BSS 106 sends the subscription request to a recipient Subscription Manager-Data Preparation (SM-DP) 108 by initiating the remote SIM provisioning upon receipt of the subscription request. The recipient BSS 106 forwards the subscription request to the recipient SM-DP 108 by sending Download Order followed by Confirm Order message. The recipient BSS 106 analyzes the subscription request and determines that the subscription request is a request for the MNP when the subscription request having the recipient MNO details and the MSISDN. The recipient BSS 106 further sends the recipient MNO details (MNC and MCC) for the MNP, UPC and MSISDN with a confirm order message to the recipient SM-DP 108 based on a response received from the recipient SM-DP 108. The recipient SM-DP 108 creates a recipient MNO profile. The recipient MNO profile includes the old MSISDN (as the user requested for the MNP). The recipient SM-DP 108 registers an MNP event including RSP event details in the SM-DS 110.

The donor BSS 112 sends a Unique Porting Code (UPC) to the LPA 114/the SM-DS 110 in response to a UPC request sent by the LPA 114/the SM-DS 110 to the donor BSS 112. The UPC has a predefined time to live (TTL) period beyond which the UPC expires. The expiry of the UPC leads to MNP expiry state or MNP termination state. The recipient BSS 106 initiates the MNP event by sending the UPC and the MSISDN to at least one of the MCHA and the donor BSS, in response to an MNP initiation request sent by the SM-DS 110 to the recipient BSS 106. The SM-DS 110 executes the MNP event with at least one of, the Donor BSS 112, the Recipient BSS 106 and the MCHA, based on the registration by the recipient SM-DP 108. The UE 104 retrieves RSP event details from the SM-DS 110 to download the recipient MNO profile from the SM-DP 108. The SM-DS 110 sends address of the appropriate recipient SM-DP to download the relevant recipient MNO profile. The LPA unit 114 within the UE 104 is adapted to download the created recipient MNO profile from the Recipient SM-DP 108. The UE 104 executes the remote SIM provisioning by transferring the eUICC 116 functioning from a donor MNO profile to the recipient MNO profile. The transfer of the eUICC 116 from the donor MNO profile to the recipient MNO profile deactivates the subscription of the UE 104 to a donor MNO and activates the subscription of the UE 104 to a recipient MNO at the porting date and time.

The system includes a clearing house administrator (MCHA) to coordinate with the recipient BSS 106 and the donor BSS 112 to execute the MNP without conflict in the MSISDN. In an embodiment, the MCHA is adapted to set a porting date and time. In another embodiment, the donor BSS 112 and the recipient BSS 106 communicates between them to set the porting date and time. The porting date and time is set once an MNP clearance and settlement is cleared between the recipient MNO and the donor MNO. The execution of the MNP event includes (a) SM-DS initiated method, (b) LPA unit-initiated method, (c) decentralized and SM-DS initiated method and (d) decentralized and LPA unit-initiated method (that as has been described in description of the following figures).

Figure 2:
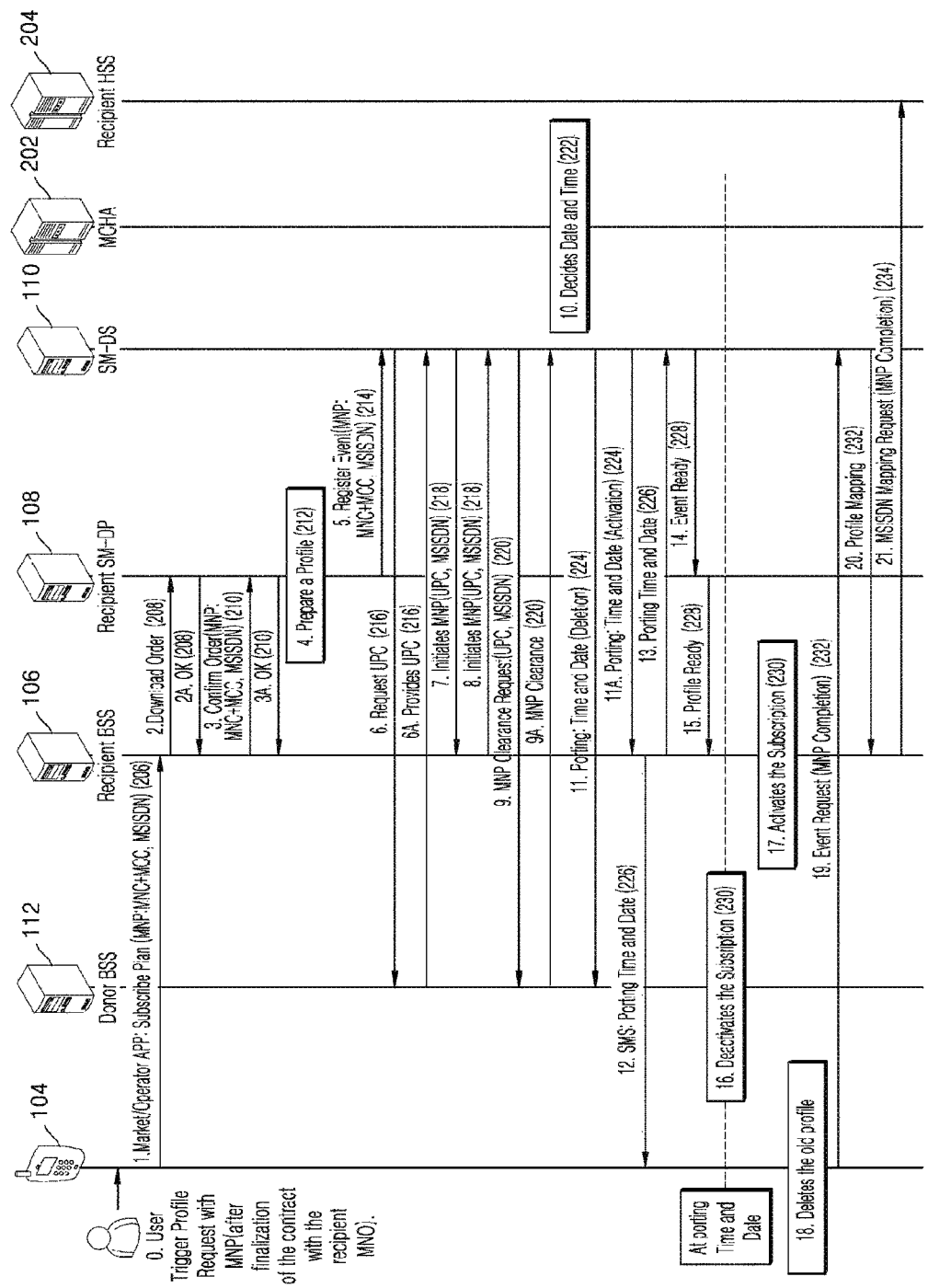
FIG. 2 illustrates a schematic flow diagram illustrating a SM-DS initiated method of performing integrated MNP and remote SIM provisioning (RSP), according to an embodiment of the present invention.

FIG. 2 illustrates a schematic flow diagram illustrating a SM-DS initiated method of performing integrated MNP and remote SIM provisioning, according to an embodiment of the present invention. At step 206, a recipient BSS 106 receives a subscription request from a user equipment 104 triggered by a user 102. In an embodiment, the user 102 triggers the subscription request through an application configured in the UE 104. The subscription request includes a mobile number portability indicator. The mobile number portability indicator includes at least one of: a user selected plan, recipient mobile network operator (MNO) details (Mobile Network Code (MNC) and a Mobile Country Code (MCC)) and a Mobile Station International Subscriber Directory Number (MSISDN).

At step 208, the recipient BSS 106 initiates the remote SIM provisioning by sending the subscription request (e.g. to create a recipient MNO profile) to a recipient Subscription Manager-Data Preparation (SM-DP) 108. The recipient BSS 106 forwards the subscription request to the recipient SM-DP 108 by sending Download Order followed by Confirm Order message to the recipient SM-DP 108. The recipient BSS 106 further receives a response from the recipient SM-DP 108 upon requesting the download order. At step 210, the recipient BSS 106 sends the details for MNP (MNC, MCC and MSISDN) with a confirm order message to the Recipient SM-DP 108 based on the response received from the recipient SM-DP 108. The recipient SM-DP 108 acknowledges receipt of the confirm order message. At step 212, the recipient SM-DP prepares a recipient MNO profile. The recipient MNO profile may include the old MSISDN (as the user requested for the MNP). At step 214, the recipient SM-DP 108 registers an MNP event in the SM-DS 110. At step 216, a donor BSS 112 sends a Unique Porting Code (UPC) to the SM-DS 110 in response to a UPC request sent by the SM-DS 110 to the donor BSS 112.

At step 218, the SM-DS 110 sends an MNP initiation request comprising the UPC and the MSISDN to the recipient BSS 106. Further an MNP Clearing house administrator (MCHA) 202 receives an MNP request from the recipient BSS 106 in response to the MNP initiation request sent by the SM-DS 110 to the recipient BSS 106. At step 220, an MNP clearance is received by the MCHA 202 from the donor BSS 112 in response to an MNP clearance request sent by the MCHA 202 to the donor BSS 112. At step 222, the MCHA sets a porting date and time to execute the MNP event. At step 224, the MCHA communicates the porting date and time to (a) the donor BSS 112 for deactivation of subscription of the UE to a donor MNO and (b) the recipient BSS 106 for activation of the subscription of the UE to a recipient MNO. At step 226, the recipient BSS 106 communicates the porting date and time to the SM-DS 110. The recipient BSS 106 further communicates the porting date and time to the UE 104. At step 228, the SM-DS 110 sends an event ready message to the recipient SM-DP 108 upon receipt of the porting date and time. The recipient SM-DP 108 communicates a profile ready message to the recipient BSS 106 upon receipt of the event ready message from the SM-DS 110.

At step 230, the donor BSS 112 deactivates the subscription of the UE 104 from the donor MNO and the recipient BSS 106 activates the subscription of the UE 104 to the recipient MNO. The LPA 114 within the UE 104 deletes donor MNO profile upon activation of the subscription of the UE 104 to the recipient MNO. At step 232, the UE 104 sends an event retrieve request to the SM-DS 110. On receiving the response (Event Request Confirm), which may include the completion of the MNP, from the SM-DS 110, the UE 104 downloads the created recipient MNO profile from the SM-DP 108 and transfers an embedded universal integrated circuit card (UICC) functioning from the donor MNO profile to the recipient MNO profile. The SM-DS 110 sends a profile mapping request to the recipient BSS 106 to map the recipient MNO profile onto the donor MNO profile to enable activation of the subscription of the UE 104 to the recipient MNO. At step 234, the recipient BSS 106 sends an MSISDN mapping request to a recipient Home Subscriber Server (204) to enable the MNP and establish communication via the recipient MNO.

Figure 3:
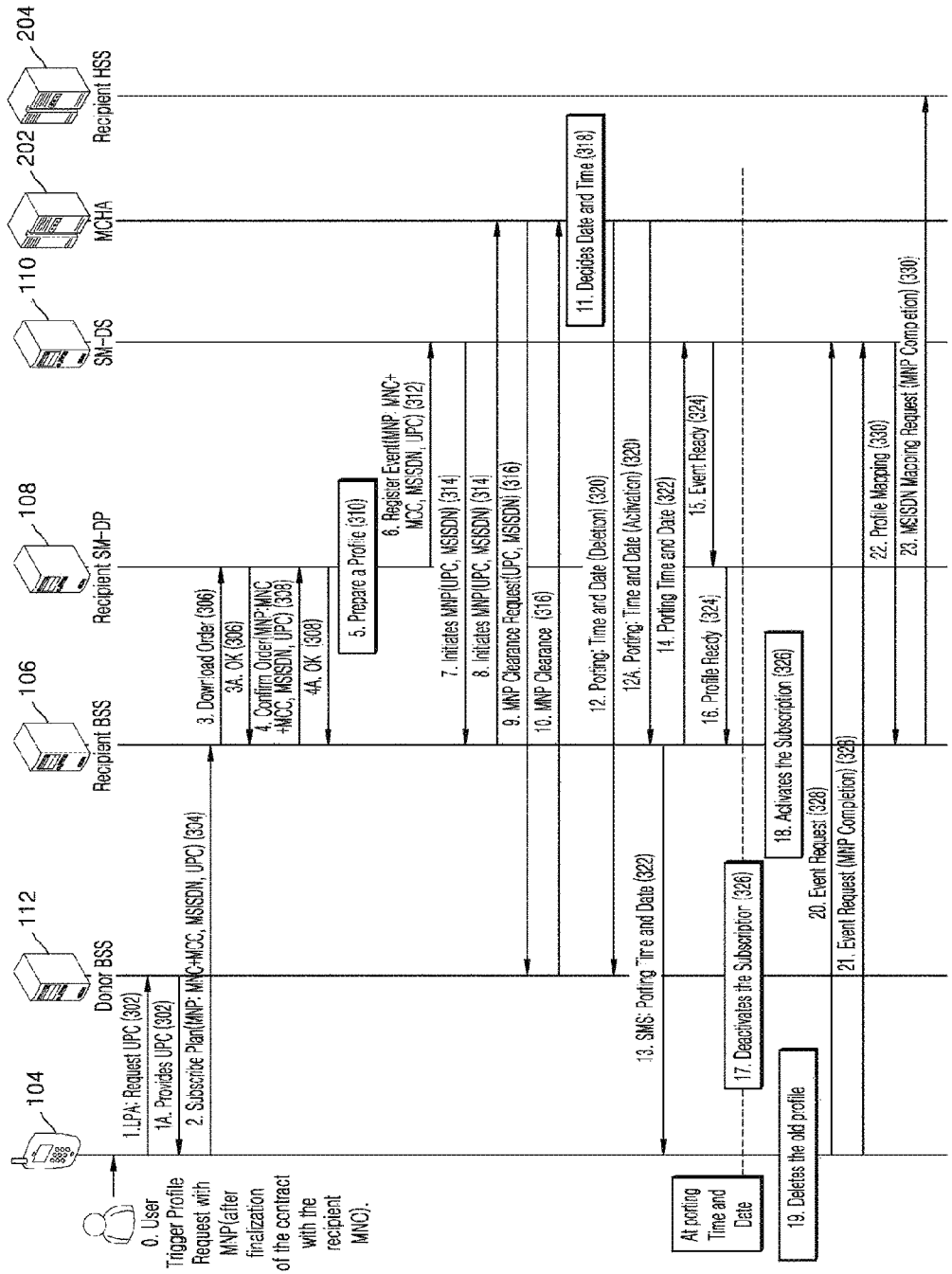
FIG. 3 illustrates a schematic flow diagram illustrating LPA unit-initiated method of performing integrated MNP and remote SIM provisioning, according to an embodiment of the present invention.

FIG. 3 illustrates a schematic flow diagram illustrating LPA unit-initiated method of performing integrated MNP and remote SIM provisioning, according to an embodiment of the present invention. At step 302, a donor BSS 112 provides a Unique Porting Code (UPC) to a UE 104 in response to a UPC request sent by the UE 104 to the donor BSS 112. At step 304, a recipient BSS 106 receives a subscription request from the user equipment 104 triggered by a user 102. In an embodiment, the user 102 triggers the subscription request through an application configured in the UE 104. The subscription request includes a mobile number portability indicator. The mobile number portability indicator includes a user selected plan, recipient mobile network operator (MNO) details (Mobile Network Code (MNC) and a Mobile Country Code (MCC)), a Mobile Station International Subscriber Directory Number (MSISDN) and the UPC. The MNP indicator includes mobile network code (MNC) and mobile country code (MCC).

At step 306, the recipient BSS 106 initiates the remote SIM provisioning by sending the subscription request (e.g. to create a recipient MNO profile) to a recipient Subscription Manager-Data Preparation (SM-DP) 108. The recipient BSS 106 forwards the subscription request to the recipient SM-DP 108 by sending Download Order followed by Confirm Order message. The recipient BSS 106 further receives a response from the recipient SM-DP 108 upon requesting the download order. At step 308, the recipient BSS 106 sends the details of the MNP (MNC, MCC, MSISDN and UPC) with a confirm order message to the Recipient SM-DP 108 based on the response received from the recipient SM-DP 108. The recipient SM-DP 108 acknowledges receipt of the confirm order message. At step 310, the recipient SM-DP 108 prepares the recipient MNO profile. The recipient MNO profile includes the old MSISDN (as the user requested for the MNP). At step 312, the recipient SM-DP 108 registers an MNP event in the SM-DS 110. The registration of the MNP event includes details of the MNC, MCC, MSISDN and UPC.

At step 314, the SM-DS 110 sends an MNP initiation request comprising the UPC and the MSISDN to the recipient BSS 106. Further an MNP Clearing house administrator (MCHA) 202 receives an MNP request from the recipient BSS 106 in response to the MNP initiation request sent by the SM-DS 110 to the recipient BSS 106. At step 316, an MNP clearance is received from the donor BSS 112 in response to an MNP clearance request sent by the MCHA 202 to the donor BSS 112. At step 318, the MCHA 202 sets a porting date and time to execute the MNP event. At step 320, the MCHA 202 communicates the porting date and time to (a) the donor BSS 112 for deactivation of subscription of the UE to a donor MNO and (b) the recipient BSS 106 for activation of the subscription of the UE to a recipient MNO. At step 322, the recipient BSS 106 communicates the porting date and time to the SM-DS 110. The recipient BSS 106 further communicates the porting date and time to the UE 104. At step 324, the SM-DS 110 sends an event ready message to the recipient SM-DP 108 upon receipt of the porting date and time. The recipient SM-DP 108 communicates a profile ready message to the recipient BSS 106 upon receipt of the event ready message from the SM-DS 110.

At step 326, the donor BSS 112 deactivates the subscription of the UE 104 to the donor MNO and the recipient BSS 106 activates the subscription of the UE 104 to the recipient MNO at the porting date and time. The LPA 114 within the UE 104 deletes donor MNO profile upon activation of the subscription of the UE 104 to the recipient MNO. At step 328, the UE 104 sends an event retrieve request to the SM-DS 110. On receiving the response (Event Request Confirm), which may include the completion of the MNP, from the SM-DS 110, the UE 104 downloads the created recipient MNO profile from the SM-DP 108 to transfer an embedded universal integrated circuit card (UICC) functioning from the donor MNO profile to the recipient MNO profile. The UE 104 then sends an MNP completion indication to the SM-DS 110. At step 330, the SM-DS 110 sends a profile mapping request to the recipient BSS 106 to map the recipient MNO profile onto the donor MNO profile to enable activation of the subscription of the UE 104 to the recipient MNO. The recipient BSS 106 sends an MSISDN mapping request to a recipient Home Subscriber Server 204 to enable the MNP and establish communication via the recipient MNO.

Figure 4:
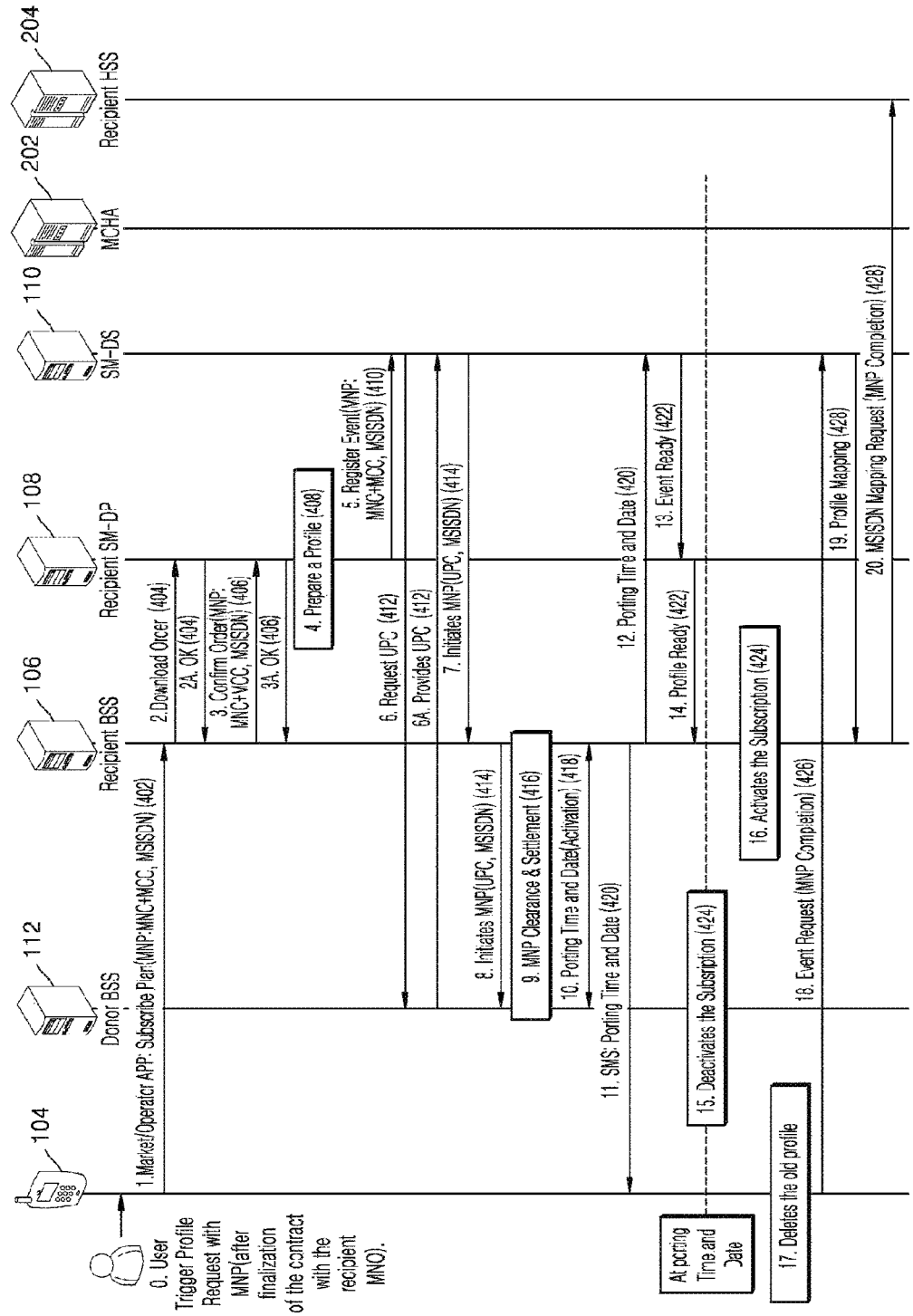
FIG. 4 illustrates a schematic flow diagram illustrating SM-DS initiated and decentralized method of performing integrated MNP and remote SIM provisioning, according to an embodiment of the present invention.

FIG. 4 illustrates a schematic flow diagram illustrating decentralized and SM-DS initiated method of performing integrated MNP and remote SIM provisioning, according to an embodiment of the present invention. At step 402, a recipient BSS 106 receives a subscription request from a user equipment 104 triggered by a user. In an embodiment, the user triggers the subscription request through an application configured in the UE 104. The subscription request includes a mobile number portability indicator. The mobile number portability indicator includes a user selected plan, recipient mobile network operator (MNO) details (Mobile Network Code (MNC) and a Mobile Country Code (MCC)) and a Mobile Station International Subscriber Directory Number (MSISDN). The MNP indicator includes mobile network code (MNC) and mobile country code (MCC).

At step 404, the recipient BSS 106 initiates the remote SIM provisioning by sending the subscription request (e.g. to create a recipient MNO profile) to a recipient Subscription Manager-Data Preparation (SM-DP) 108. The recipient BSS 106 forwards the subscription request to the recipient SM-DP 108 by sending Download Order followed by Confirm Order message. The recipient BSS 106 receives a response from the recipient SM-DP 108 upon requesting the download order. At step 406, the recipient BSS 106 sends the details for MNP (MNC, MCC and MSISDN) with a confirm order message to the recipient SM-DP 108 based on the response received from the recipient SM-DP 108. The recipient SM-DP 108 acknowledges receipt of the confirm order message. At step 408, the recipient SM-DP prepares a recipient MNO profile. The recipient MNO profile includes the old MSISDN (as the user requested for the MNP). At step 410, the recipient SM-DP 108 registers an MNP event in the SM-DS 110. At step 412, a donor BSS 112 sends a Unique Porting Code (UPC) to the SM-DS 110 in response to a UPC request sent by the SM-DS 110 to the donor BSS 112.

At step 414, the SM-DS 110 sends an MNP initiation request comprising the UPC and the MSISDN to the recipient BSS 106 upon receipt of the UPC. The recipient BSS 106 sends an MNP request comprising the UPC and the MSISDN to the donor BSS 112 upon receipt of the MNP initiation request from the SM-DS 110. At step 416, the donor BSS 112 and the recipient BSS 106 communicates between each other to obtain MNP clearance and settlement. At step 418, the donor BSS 112 and the recipient BSS 106 communicates between each other to set porting date and time once the MNP clearance and settlement is obtained. At step 420, the recipient BSS 106 communicates the porting date and time to the UE 104 and the SM-DS 110. At step 422, the SM-DS 110 sends an event ready message to the recipient SM-DP 108. The recipient SM-DP 108 sends a profile ready message to the recipient BSS 106 upon receipt of the profile ready message.

At step 424, the donor BSS 112 deactivates subscription of the UE to a donor MNO and the recipient BSS 106 activates the subscription of the UE to a recipient MNO at the porting date and time. The LPA 114 within the UE 104 deletes a donor MNO profile upon activation of the subscription of the UE 104 to the recipient MNO. At step 426, the UE 104 sends an event retrieve request to the SM-DS 110. On receiving the response (Event Request Confirm), which may include the completion of the MNP, from the SM-DS 110, the UE 104 downloads the created recipient MNO profile from the SM-DP 108 to transfer an embedded universal integrated circuit card (UICC) functioning from the donor MNO profile to the recipient MNO profile. At step 428, the SM-DS 110 sends a profile mapping request to the recipient BSS 106 to map the recipient MNO profile onto the donor MNO profile to enable activation of the subscription of the UE 104 to the recipient MNO. The recipient BSS 106 sends an MSISDN mapping request to a recipient Home Subscriber Server 204 to enable the MNP and establish communication via the recipient MNO.

Figure 5:
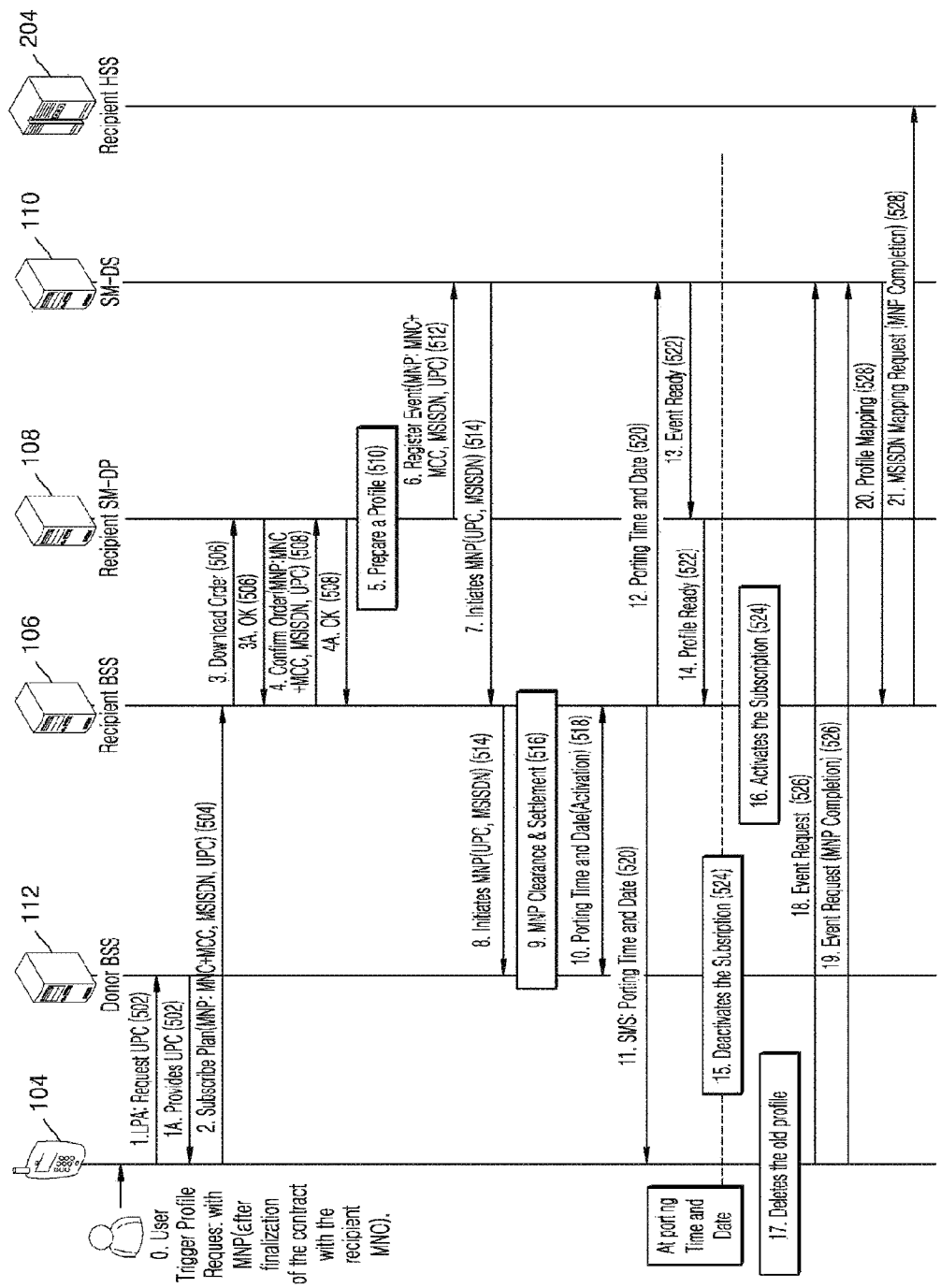
FIG. 5 illustrates a schematic flow diagram illustrating LPA unit-initiated and decentralized method of performing integrated MNP and remote SIM provisioning, according to an embodiment of the present invention.

FIG. 5 illustrates a schematic flow diagram illustrating decentralized and LPA unit-initiated method of performing integrated MNP and remote SIM provisioning, according to an embodiment of the present invention. At step 502, a donor BSS 112 provides a Unique Porting Code (UPC) to a UE 104 in response to a UPC request sent by the UE 104 to the donor BSS 112. At step 504, a recipient BSS 106 receives a subscription request from the user equipment 104 triggered by a user 102. In an embodiment, the user 102 triggers the subscription request through an application configured in the UE 104. The subscription request includes a mobile number portability indicator. The mobile number portability indicator includes a user selected plan, recipient mobile network operator (MNO) details (Mobile Network Code (MNC) and a Mobile Country Code (MCC)), a Mobile Station International Subscriber Directory Number (MSISDN) and the UPC. The MNP indicator includes mobile network code (MNC) and mobile country code (MCC).

At step 506, the recipient BSS 106 initiates the remote SIM provisioning by sending the subscription request (e.g. to create a recipient MNO profile) to a recipient Subscription Manager-Data Preparation (SM-DP) 108. The recipient BSS 106 forwards the subscription request to the recipient SM-DP 108 by sending Download Order followed by Confirm Order message. The recipient BSS 106 further receives a response from the recipient SM-DP 108 upon requesting the download order. At step 508, the recipient BSS 106 sends the details of the MNP (MNC, MCC, MSISDN and UPC) with a confirm order message to the Recipient SM-DP 108 based on the response received from the recipient SM-DP 108. The recipient SM-DP 108 acknowledges receipt of the confirm order message. At step 510, the recipient SM-DP prepares a recipient MNO profile. The recipient MNO profile may include the old MSISDN (as the user requested for the MNP). At step 512, the recipient SM-DP 108 registers an MNP event in the SM-DS 110. The registration of the MNP event includes details of the MNC, MCC, MSISDN and UPC.

At step 514, the SM-DS 110 sends an MNP initiation request comprising the UPC and the MSISDN to the recipient BSS 106 upon receipt of the UPC from the donor BSS 112. The recipient BSS 106 sends the MNP request comprising the UPC and the MSISDN to the donor BSS upon receipt of the MNP initiation request from the SM-DS 110. At step 516, the donor BSS 112 and the recipient BSS 106 communicates between each other to obtain MNP clearance and settlement. At step 518, the donor BSS 112 and the recipient BSS 106 communicates between each other to set porting date and time once the MNP clearance and settlement is obtained. At step 520, the recipient BSS 106 communicates the porting date and time to the UE 104 and the SM-DS 110. At step 522, the SM-DS 110 sends an event ready message to the recipient SM-DP 108. The recipient SM-DP 108 sends a profile ready message to the recipient BSS 106 upon receipt of the event ready message.

At step 524, the donor BSS 112 deactivates subscription of the UE 104 to a donor MNO and the recipient BSS 106 activates the subscription of the UE 104 to a recipient MNO at the porting date and time. The LPA 114 within the UE 104 deletes a donor MNO profile upon activation of the subscription of the UE 104. At step 526, the UE 104 sends an event retrieve request to the SM-DS 110. On receiving the response (Event Request Confirm), which may include the completion of the MNP, from the SM-DS 110, the UE 104 downloads the created recipient MNO profile from the SM-DP 108 to transfer an embedded universal integrated circuit card (UICC) functioning from the donor MNO profile to the recipient MNO profile. The UE 104 then sends an MNP completion indication to the SM-DS 110. At step 528, the SM-DS 110 sends a profile mapping request to the recipient BSS 106 to map the recipient MNO profile onto the donor MNO profile to enable activation of the subscription of the UE 104 to the recipient MNO. The recipient BSS 106 sends an MSISDN mapping request to a recipient Home Subscriber Server 204 to enable the MNP and establish communication via the recipient MNO.

Figure 6:
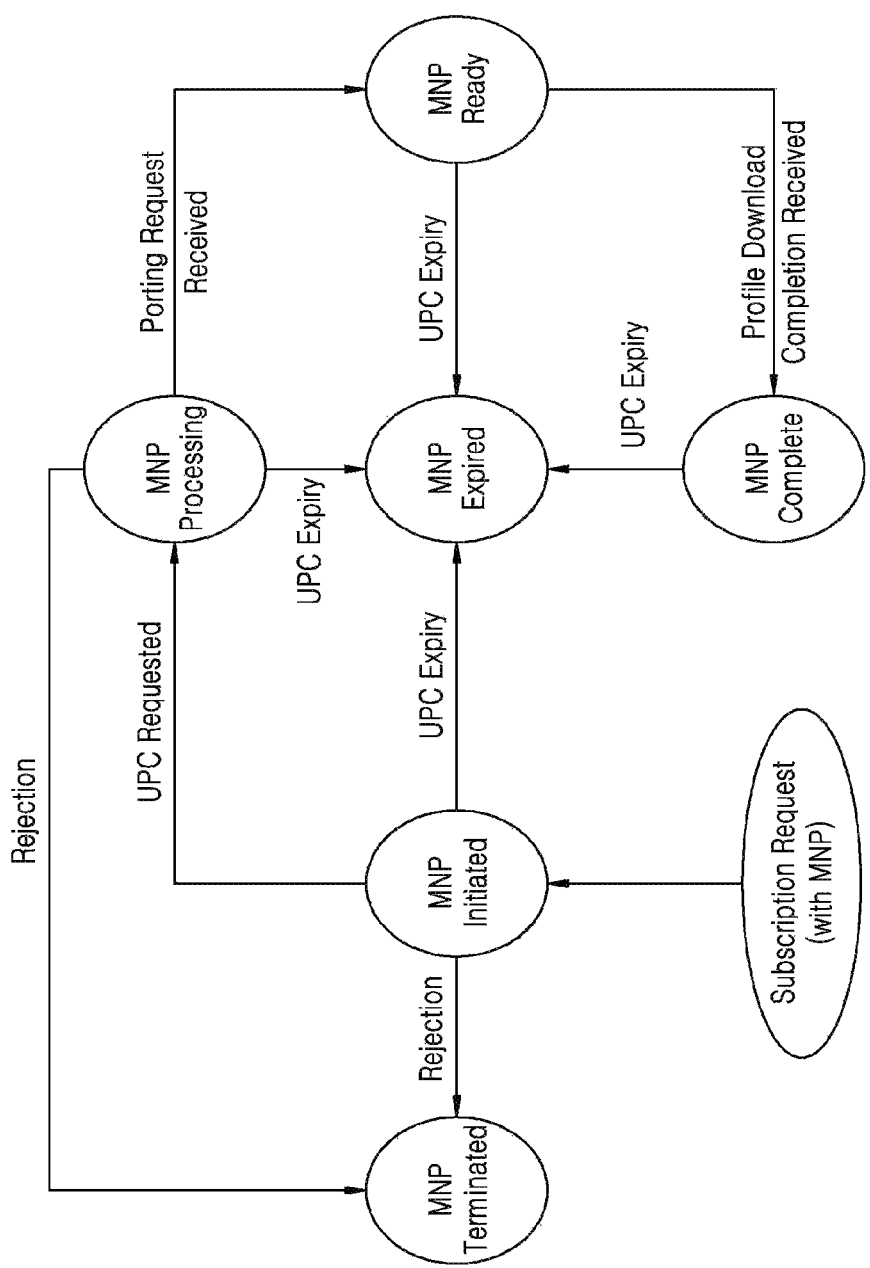
FIG. 6 illustrates a schematic diagram illustrating a system undergoing transitions while performing integrated MNP and remote SIM provisioning, according to an embodiment of the present invention.

FIG. 6 illustrates a schematic diagram illustrating a system undergoing transitions while performing integrated MNP and remote SIM provisioning, according to an embodiment of the present invention. According to this embodiment, the system undergoes a first transition from a null state to an MNP_I (MNP initiated) state. The first transition is initiated by a trigger of sending a subscription request comprising an MNP indicator by a UE 104 to a recipient BSS 106. The MNP_I state indicates the initiation of the MNP performed either through SM-DS 110 or LPA 114. The system then undergoes a second transition from the MNP_I state to MNP_P (MNP processing) state. The second transition is initiated by a trigger of requesting Unique Porting Code (UPC) by one of (a) the SM-DS 110 and (b) the LPA 114 to a donor BSS 112. Porting date and Time is set upon receipt of the UPC.

The system then undergoes a third transition from the MNP_P state to MNP_R (MNP ready) state. The third transition is initiated by a trigger of receiving an MNP request from the recipient BSS 106. The recipient BSS 106 then receives a profile ready message from a recipient SM-DP 108. The system then undergoes a fourth transition from the MNP_R state to MNP_C (MNP completion) state. The fourth transition is initiated by a trigger of MNP completion request from the LPA 114 within the UE 104. The donor BSS 112 deactivates subscription of the UE 104 to a donor MNO profile. The recipient BSS 106 upon receipt of the profile ready message downloads a recipient MNO profile from the recipient SM-DP 108 and activates the subscription of the UE 104 to a recipient MNO profile. The SM-DS 110 then sends a profile mapping request to the recipient BSS 106 to map a recipient MNO profile onto a donor MNO profile. The recipient BSS 106 then sends MSISDN mapping request to a recipient HSS 204 to perform MSISDN mapping to enable the MNP.

Figure 7:
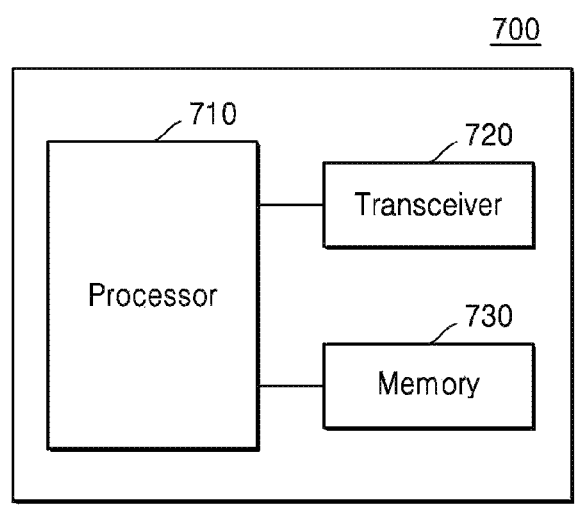
FIG. 7 illustrates a block diagram illustrating the structure of a preferred device according to another embodiment of the present disclosure.

The system may undergo sixth transition from at least one of (a) MNP_I, (b) MNP_P, (c) MNP_R and (d) MNP_C state to MNP_E (MNP expiry state). The sixth transition is initiated by a trigger of expiry of the UPC. The UPC expires beyond predefined time to live (TTL) period. The system may also undergo seventh transition from at least one of (a) MNP_I and (b) MNP_P state to MNP_T (MNP termination)

state. The seventh transition is initiated by a trigger of MNP termination request received from at least one of (a) the donor BSS 112 and (b) the recipient BSS 106. The MNP termination may be due to expiry of the UPC or failure at MNP initiation level. FIG. 7 is a block diagram illustrating the structure of a preferred device according to another embodiment of the present disclosure.

Referring to the FIG. 7, the user equipment 700 may include a processor 710, a transceiver 720 and a memory 730. However, all of the illustrated components are not essential. The user equipment 104 may be implemented by more or less components than those illustrated in FIG. 7 In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the user equipment 104 may be implemented by the processor 710.

The processor 710 may sense each configured resource pool and/or each group of resources to obtain a result of sensing, the result of sensing containing a set of remaining candidate single TU resources of each resource pool. The processor 710 may select, from the set of remaining candidate single TU resources of each resource pool and/or each group of resources, one candidate single TU resource as a transmission resource.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the device 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention. Furthermore, those of ordinary skill in the art will appreciate that the foregoing description is by way of example only and is not intended to limit the invention. Thus, it is intended that the present subject matter covers such modifications and variations.

The invention claimed is:

1. A method, performed by a subscription manager-discovery server (SM-DS), of managing mobile number portability (MNP) in a wireless communication system, the method comprising:
  receiving, from a subscription manager-data preparation (SM-DP) server, MNP information generated based on a subscription request of user equipment (UE);
  transmitting, based on the MNP information, a request for a unique porting code (UPC) to a first operator server to which the UE is subscribed;
  transmitting, based on the UPC, a subscription request of the UE to a second operator server; and
  receiving porting time information of the UE determined based on the subscription request.

2. The method of claim 1, wherein the MNP information comprises at least one of a mobile network code (MNC), a mobile country code (MCC), or mobile station international subscriber directory number (MSISDN).

3. The method of claim 1, wherein the porting time information is determined by the second operator server or an MNP clearing house administrator (MCHA).

4. The method of claim 1, further comprising:
  receiving, from the UE, a message requesting completion of the subscription request; and
  transmitting, to the second operator server, a request for mapping a profile generated by the SM-DP server to a profile related to the first operator server.

5. The method of claim 4,
  wherein the UE is updated according to the profile generated by the SM-DP server, and
  wherein the first operator server is deactivated for the UE and the second operator server is activated for the UE.

6. A subscription manager-discovery server (SM-DS) for managing mobile number portability (MNP) in a wireless communication system, the SM-DS comprising:
  a memory;
  a transceiver; and
  at least one processor connected with the transceiver and configured to:
    receive MNP information generated based on a subscription request of user equipment (UE) from a subscription manager-data preparation (SM-DP) server;
    transmit, based on the MNP information, a request for a unique porting code (UPC) to a first operator server to which the UE is subscribed;
    transmit, based on the UPC, a subscription request of the UE to a second operator server; and
    receive, porting time information of the UE determined based on the subscription request.

7. The SM-DS of claim 6, wherein the MNP information comprises at least one of a mobile network code (MNC), a mobile country code (MCC), or mobile station international subscriber directory number (MSISDN).

8. The SM-DS of claim 6, wherein the porting time information is determined by the second operator server or an MNP clearing house administrator (MCHA).

9. The SM-DS of claim 6,
  wherein the at least one processor is further configured to:
  receive, from the UE, a message requesting completion of the subscription request; and
  transmit, to the second operator server, a request for mapping a profile generated by the SM-DP server to a profile related to the first operator server.

10. The SM-DS of claim 9,
wherein the UE is updated based on the profile generated by the SM-DP server, and
the first operator server is deactivated for the UE and the second operator server is activated for the UE.

* * * * *